(12) United States Patent
Price et al.

(10) Patent No.: US 7,285,328 B2
(45) Date of Patent: Oct. 23, 2007

(54) PARTICULATE TITANIUM DIOXIDE COATED PRODUCT AND METHOD OF FORMING TITANIUM DIOXIDE COATED PARTICLES

(75) Inventors: David Elwyn Price, Williamstown (AU); Thomas Aloysius O'Donnell, Glen Iris (AU)

(73) Assignee: Depco-TRH Pty Ltd, Williamstown (AU)

( * ) Notice: Subject to any disclaimer, the term of this patent is extended or adjusted under 35 U.S.C. 154(b) by 0 days.

(21) Appl. No.: 10/221,436

(22) PCT Filed: Mar. 13, 2001

(86) PCT No.: PCT/AU01/00272

§ 371 (c)(1),
(2), (4) Date: Dec. 3, 2002

(87) PCT Pub. No.: WO01/66652

PCT Pub. Date: Sep. 13, 2001

(65) Prior Publication Data

US 2003/0143421 A1 Jul. 31, 2003

(30) Foreign Application Priority Data

Mar. 10, 2000 (AU) .......................... AU00/PQ6194

(51) Int. Cl.
*B32B 5/16* (2006.01)
*B05D 3/10* (2006.01)
*B05D 7/24* (2006.01)

(52) U.S. Cl. ...................... 428/403; 427/215; 427/218; 427/301

(58) Field of Classification Search ................ 428/402, 428/403; 427/215, 218, 299, 301
See application file for complete search history.

(56) References Cited

U.S. PATENT DOCUMENTS

| | | | | |
|---|---|---|---|---|
| 3,418,146 A | * | 12/1968 | Rieger et al. ................ | 106/440 |
| 3,437,515 A | * | 4/1969 | Rieger et al. ................ | 427/164 |
| 4,038,099 A | * | 7/1977 | DeLuca et al. ............. | 106/417 |
| 4,944,936 A | * | 7/1990 | Lawhorne .................... | 423/612 |
| 5,145,719 A | | 9/1992 | Towata et al. | |
| 5,221,341 A | | 6/1993 | Franz et al. | |
| 5,248,556 A | * | 9/1993 | Matijevic et al. ........... | 428/403 |
| 5,624,486 A | * | 4/1997 | Schmid et al. .............. | 106/404 |
| 6,013,369 A | * | 1/2000 | Adachi et al. ............... | 428/403 |
| 6,063,179 A | | 5/2000 | Schmid et al. | |
| 6,150,022 A | * | 11/2000 | Coulter et al. .............. | 428/403 |
| 6,176,918 B1 | | 1/2001 | Glausch et al. | |
| 6,432,535 B1 | * | 8/2002 | Noguchi et al. ............ | 428/403 |
| 6,626,989 B1 | * | 9/2003 | DeLuca et al. ............. | 106/417 |

FOREIGN PATENT DOCUMENTS

EP 0 455 401 11/1991
GB 1 480 530 7/1977

OTHER PUBLICATIONS

Derwent Abstracts Accession No. 93-025345/03, SU 1713886-A1, (Lengd. Lensovet. Techn. Inst) Feb. 1992.
Hanprasopwattana, et al., Titania Coatings on Monodisperse Silica Spheres (Characterization Using 2-Propanol Dehydration and TEM), Langmuir, vol. 12, pp. 3173-3179, 1996.
Derwent Abstract Accession No. 97-532928/49, JP 09-255891 A, (Yoshida Kogyo KK) Sep. 1997.
C. Deng, et al., "Preparation of titania/silica complex support by gas phase adsorption and dispersion state of molybdenum trioxide on the surface of complex support", Chemical Abstracts, vol. 119, No. 22, abstract No. 234888y, Nov. 1993.
C. Deng, et al., "Preparation of titania/γ-alumina complex support by gas phase adsorption and state of titania on γ-alumina surface", Chemical Abstracts, vol. 117, No. 4, abstract No. 34416q, Jul. 1992.
Petrova, et al., "Phase formation and change of the surface acidity in synthesis of a titanium layer on γ-alumina by molecular superposition", vol. 116, No. 10, abstract No. 86998e, Mar. 1992.
Z. Wei, et al., "Studies of Titnia-alumina as support for molybdenum catalysts", Chemical Abstracts, vol. 121, No. 25, abstract No. 304322, Dec. 1994.
Patent Abstracts of Japan, JP 60-099171 A (Titan Kogyo KK), Jun. 1985.
Derwent Abstract Accession No. 98-562946/48, JP 10-251016 (Agency of Ind Sci &Technology), Sep. 1998.
Derwent Abstract Accession No. 89-215200/30, HU T048660 A (Aluminiumipari Tervezo), Jun. 1989.
Lei, et al, "Preparation of Heterogeneous Photocatalyst ($TiO_2$)/Alumina by Metalo-Organic Chemical Vapor Deposition", Ind. Eng. Chme. Res., vol. 28, pp. 3381-3385, 1999.
Dolgushev, et al., "Composition of the Sodium-Rich Surface Layer on Alumina and Its Effect on Reaction with $TiCl_4$ and $H_2O$ Vapors", Inorganic Materials, vol. 31, No. 2, pp. 210-213, 1995.
Aigner-Held, et al., "Liquid Chromatography on Metal Oxids with Silca Geometry", Journal Chromatography, vol. 189, pp. 139-144, 1980.

* cited by examiner

Primary Examiner—H. T Le
(74) Attorney, Agent, or Firm—Merchant and Gould P.C.

(57) ABSTRACT

A composition of matter comprises particles each having a substrate being an oxide or other suitable compound of a metal other than titanium or of certain non-metal elements, and a coating on said substrate being a layer of titanium dioxide. A method of forming particles of titania-coated substrate, includes contacting a bed of hydrated particles of an oxide or other suitable compound of a metal other than titanium or of certain non-metal elements with a fluid medium containing flowing titanium tetrachloride, under conditions in which a layer comprising one or more involatile oxychloride or oxide compounds is formed at and below the surface of each of a multiplicity of the particles of the oxide or other suitable compound which thereby provides a substrate for the layer. The oxychloride or oxide compound or compounds are treated to convert the layer to a Titania coating on the particles.

54 Claims, No Drawings

PARTICULATE TITANIUM DIOXIDE COATED PRODUCT AND METHOD OF FORMING TITANIUM DIOXIDE COATED PARTICLES

FIELD OF THE INVENTION

This invention relates to a commercially usable product containing titanium dioxide ($TiO_2$), also known as titania, and to methods for its production that are generally applicable to forming coated particles. In a particular embodiment, the invention provides a product which may be a substitute for conventional pigment grade $TiO_2$, currently the white base pigment used in most paint products, in plastics and paper and in many other applications.

BACKGROUND ART

There are two principal technologies for producing pigment-grade titanium dioxide. The more recent is the Chloride Process in which titanium tetrachloride ($TiCl_4$), produced by chlorination of synthetic rutile, is reacted with oxygen at about 1000° C. to give $TiO_2$ in the rutile crystal form that is normally required for use as a pigment. In the older Sulphate Process ilmenite is treated with sulphuric acid to give titanyl sulphate ($TiOSO_4$) which is hydrolysed to $TiO_2$ in the anatase form. The anatase form must then be calcined to rutile at about 1000° C. The products from both processes are subjected to various proprietary finishing steps for ultimate use as pigments.

In the prior art, powders have been proposed in which mixtures of components include alumina and titania and which are applied by flame spraying to steel and other substrates to provide coatings that are highly impervious and abrasion, corrosion and oxidation resistant. For example, U.S. Pat. No. 3,607,343 discloses a wide range of spray powders which include complex mixtures of many oxides, including alumina and titania, as well as fluxing ceramics such as lithium cobaltite and thermally unstable resin varnishes. The mixed powders are applied through a high temperature spray gun to produce a continuous grey or black layer on a metal substrate. These coatings differ totally from conventional titania based pigments and from the titania coated alumina proposed here. The former are very fine white powders comprising only pure titania, while the latter is a fine white powder of alumina particles coated with titania.

SUMMARY OF THE INVENTION

In a first aspect, a fundamental concept of this invention is to provide an alternative pigment-grade titanium material in which the particles are not solid titania but instead a titania-coated substrate of a suitable material such as a metal oxide. Moreover, in a preferred form, the invention entails the further concept of producing the titania-coated alumina from intermediates of the aforementioned Chloride Process and of the well known Bayer Process for producing alumina from bauxite ore. This production technique has broader application to the formation of coated particles.

The present invention in its most general form provides, in its first aspect, a composition of matter comprising particles each having a substrate being an oxide or other suitable compound of a metal other than titanium or of certain non-metal elements, and a coating on said substrate being a layer of titanium dioxide. The titania coating may be a uniform, substantially homogenous undivided layer of titanium dioxide onto and into the underlying substrate or alternatively it may be randomly available over and into the surface of the substrate. The coating is preferably effected in a simple hydrolysis reaction.

In a second aspect, the invention provides a method of forming particles of titania-coated substrate, including:
contacting a bed of hydrated particles of an oxide or other suitable compound of a metal other than titanium or of certain non-metal elements with a fluid medium containing flowing titanium tetrachloride, under conditions in which a layer comprising one or more involatile oxychloride or oxide compounds is formed at and below the surface of each of a multiplicity of said particles of said oxide or other suitable compound which thereby provides a substrate for said layer; and
treating said oxychloride or oxide compound or compounds to convert the layer to a titania coating, preferably a pigment grade coating, on the particles.

More generally, in a third aspect, the invention provides a method of forming particles having a metal oxide coating on a substrate, including:
contacting a bed of hydrated particles of an oxide or other suitable compound of a first metal or of certain non-metal elements with a fluid medium containing a halide of a second metal, under conditions in which a layer comprising one or more involatile oxyhalide or oxide compounds of the second metal is formed at and below the surface of each of a multiplicity of said particles of said oxide or other suitable compound which thereby provides a substrate for said layer; and
treating said oxyhalide or oxide compound or compounds to convert the layer to a coating of an oxide of said second metal.

The preferred halide in the third aspect of the invention is chloride, whereby the involatile oxyhalide compound(s) is an oxychloride compound.

In any advantageous application of said third aspect, the second metal is titanium whereby said coating is a titania coating.

FURTHER PREFERRED ASPECTS OF THE INVENTION

The bed of hydrated particles is preferably a moving bed.
In all of the first, second and third aspects, the oxide or other compound is advantageously selected for its ability to absorb or adsorb sufficient water to sustain the formation of said layer.

In the first and second aspects, the substrate is preferably substantially less valuable or expensive than titania. A suitable oxide for the substrate is alumina, but more generally the hydrated particles may be selected from the group including oxides and hydroxides of aluminium, silicon, zinc, lead, tin, bismuth, and other transition metal, group III and group IV elements. Some carbonates and other compounds may also be suitable as substrates. These include carbonates of calcium and magnesium and of the elements listed above as providing suitable oxide substrates.

The titania coating on each particle preferably includes a lowermost transition zone in which titania is interspersed into the underlying substrate.

Where the hydrated metal oxide particles are hydrated alumina particles, these may comprise or include aluminium hydroxide $Al(OH)_3$, also known as alumina trihydrate or gibbsite, or aluminium oxide hydroxide AlO.OH, also known as aluminium monohydroxide or boehmite, but can be any suitable form that provides sufficient hydroxyl groups for the formation of the titanium oxychloride compounds. It is believed that the titanium tetrachloride (TiCl$_4$) reacts with the hydroxyl groups on the surface of the hydrated alumina particles to produce the titanium oxychloride compounds.

If, on the other hand, reaction of TiCl$_4$ with the hydroxyl groups of the hydrated alumina or other substrate is insufficient, the extent of reaction can be increased by pretreating the hydrated alumina or other substrate with steam or water to ensure an appropriate amount of water, absorbed on the alumina, available for a more extended hydrolysis reaction.

The aforesaid conditions preferably include a proportional presence of water which is in deficit relative to the alternative reaction of the titanium tetrachloride to produce hydrated titania and an aqueous solution of hydrochloric acid as in reaction (1).

TiCl$_4$ is a volatile liquid (mp −23° C., bp 137° C.) which is very readily hydrolysed. With excess water, the overall reaction produces hydrated titania (TiO$_2$.xH$_2$O) and an aqueous solution of hydrochloric acid according to the following equation:

$$TiCl_4 + (2+x)H_2O \rightarrow TiO_2.xH_2O + 4HCl \quad (1)$$

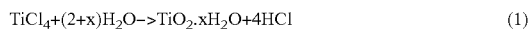

Reaction of TiCl$_4$ with a deficit of water, on the other hand, leads to the formation of relatively involatile oxychlorides of titanium, of which the best characterised is titanium oxydichloride (TiOCl$_2$), in accordance with the following equation:

$$TiCl_4 + H_2O \rightarrow TiOCl_2 + 2HCl \quad (2)$$

In one embodiment of the second aspect of the invention, which might be referred to as Solvent Phase Hydrolysis, the fluid medium is a solution of TiCl$_4$ in an organic solvent. The organic solvent is preferably one which is non-polar and immiscible with water, such as carbon tetrachloride, benzene or cyclohexane, or of very low polarity such as toluene, trichlorethylene, or a hydrocarbon such as heptane. TiCl$_4$ is reported as being very soluble in non-polar solvents while TiOCl$_2$, the typical product of reaction formed at the interface, is reported as being sparingly soluble in non-polar solvents. A more polar solvent, such as an alcohol or a ketone, may be more efficient in wetting the solid hydrated alumina, but TiOCl$_2$ is likely to be soluble in such a solvent and to diffuse away from the surface of the solid.

When the TiCl$_4$ reacts with the hydrated alumina an oxychloride such as TiOCl$_2$ will be formed at the surface of the alumina as indicated in equation (2) and the HCl also formed is soluble in non-polar solvents and, for recycling of the solvent, could be stripped from the solvent by distillation or by extraction with an aqueous alkaline solution in the case of a water-immiscible solvent. An oxychloride of aluminium, such as AlOCl, is also likely to be formed in the reaction interface.

The contacting step may be carried out at ambient temperature. If necessary, the extent of equation (2) could be increased by reacting the TiCl$_4$ solution under reflux additions, or at some appropriate temperature above ambient.

One alternative form of said treatment of the titanium oxychloride layer may be a hydrolysis treatment in which the titanium oxydichloride coated hydrated alumina is treated with steam under conditions that result in the coating of the alumina with hydrated titanium (TiO$_2$.xH$_2$O) in accordance with the following reaction:

$$TiOCl_2 + (1+x)H_2O \rightarrow TiO_2.xH_2O + 2HCl \quad (3)$$

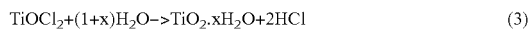

HCl, the other product of this reaction, is very volatile and is swept away from the reaction zone.

When the hydrated alumina, coated with TiOCl$_2$ and a compound such as AlOCl, is heated through temperatures of 200 to 400° C., the TiOCl$_2$ and AlOCl are converted in a pyrohydrolysis reaction with excess water vapour to give a mixed zone of AlO.OH and TiO(OH)$_2$ which bonds the TiO$_2$ formed after calcination at high temperatures to the Al$_2$O$_3$ substrate. At temperatures of about 1000° C., the hydrated titania is calcined to the usually required pigment-grade rutile form of TiO$_2$. If anatase coating is required, the final calcination should be conducted at temperatures considerably less than 1000° C., for example at temperatures of about 400° C. to 800° C.

If a less thermally stable substrate such as calcium carbonate is used, calcination at a temperature lower than 1000° C., for example 400° C. to 800° C., may be necessary to prevent conversion of the calcium carbonate to strongly basic calcium oxide. Under these conditions, the titania coating would be in the anatase form.

Alternatively, the pyrohydrolysis reaction can be conducted as a separate step before calcination.

In an alternative embodiment of the treatment of the titanium oxychloride layer, the coated alumina particles may be subjected to moderate heating (eg. to a temperature in the range 150 to 250° C., preferably above 180° C.), in a gas stream under conditions whereby the oxychlorides decompose to titanium dioxide and titanium tetrachloride as follows:

$$2TiOCl_2 \rightarrow TiO_2 + TiCl_4 \quad (4)$$

The TiO$_2$ remains as a coating of the surface of the alumina and the latter, a volatile gas, is swept away and recycled. If the resulting TiO$_2$ is in the anatase form, it must be calcined to obtain pigment-grade rutile.

The heating and calcination steps may be combined. In such a case, the initial titanium oxychloride-coated alumina is preferably heated to a temperature of about 1000° C. to effect the calcination to rutile and to remove any residual titanium tetrachloride.

In another embodiment of the second aspect of the invention, known as Vapour Phase Hydrolysis, the fluid medium containing flowing titanium tetrachloride is a gas stream containing titanium tetrachloride. The gas stream preferably includes titanium tetrachloride (TiCl$_4$) in dry air or nitrogen.

When the TiCl$_4$ reacts with the hydrated alumina, the layer comprising one or more titanium oxychloride compounds, involatile in this embodiment, may include primarily titanium oxydichloride (TiOCl$_2$), as in equation (2).

Preferably, the contacting step is carried out at ambient temperature whereby the other product of equation (2), HCl, is removed in the gas stream.

If necessary, the extent of reaction (2) can be controlled by adjustment of the TiCl$_4$ contribution in the gas stream by increasing the temperature and the vapour pressure of the TiCl$_4$ source, or by increasing the temperature of the alumina reaction bed.

It is current commercial practice to coat titanium dioxide particles with thin layers of oxides of elements such as silicon, aluminium and zirconium or combinations of such oxides in order to improve physical properties such as dispersibility, and to minimise interaction of the titanium dioxide particles with ultra-violet light. It will be appreciated that the novel technology described in this specification for coating an oxide or other substrate with titania can be used to coat the titania-coated oxide or other substrate with oxides of silicon, aluminium or zirconium or with combinations of such oxides by exposing the hydrated titanium oxychloride coated particles to solutions of appropriate concentrations in solvents of zero or very low polarity of suitable halides of silicon, aluminium and zirconium or any combination of such halides. Preferred halides include silicon tetrachloride, aluminium chloride and zirconium chloride or any combination of those or other chlorides. Subsequent pyrohydrolysis reactions, conducted separately or in situ during calcination, would provide particles of the substrate coated firstly with titania and then with oxides such as silica, alumina or zirconia or combinations of such oxides.

An alternative approach is to pyrohydrolyze the particles coated with titanium oxychloride, hydrate them again and then react those particles suspended in cyclohexane with silicon or other chloride, and then pyrohydrolyze and calcine the product.

It will be appreciated that, given the relative price differential between alumina and pigment-grade titanium dioxide, the proposed composition of the invention would be economically attractive as a pigment product. If the material is used for this purpose, the initial alumina feed particles would typically need to be pretreated, eg. by milling, so that the final coated particles are of dimensions consistent with use as a pigment grade powder.

It will also be appreciated that the production process is attractive because the components utilised can be intermediates, respectively titanium tetrachloride and hydrated alumina, in the commercially established Chloride Process in the $TiO_2$ industry and in the Bayer Process in the alumina industry. Hydrated alumina is already established as a starting material for various aluminium chemicals and, after calcination and grinding, itself has applications in ceramics and as a wear resistant constituent in other materials. In fact it is reasonable to assume that the product of the invention may be used as feedstock to produce an aluminium-titanium metal alloy.

EXAMPLE 1

Aluminium hydroxide, $Al(OH)_3$, was hydrated by adding $H_2O$ dropwise to a vigorously stirred suspension of 300 g of $Al(OH)_3$ in $CCl_4$. The solid was isolated by vacuum filtration, washed with $CCl_4$ and air-dried. The weight of the solid indicated that 73 mol % of water had been adsorbed. The $TiCl_4$ (10 mol %) was added dropwise to a suspension of 30 grams of the hydrated $Al(OH)_3$ in 100 ml of $CCl_4$. The $Al(OH)_3$ assumed a yellow colour, that of $TiOCl_2$, immediately. After 1 hour, a 1 ml aliquot of $CCl_4$ was taken and syringed into an aqueous solution of NaOH. No precipitate of insoluble $TiO_2$ was observed indicating that the reaction was complete. Part of the solid product was analysed using X-ray fluorescence techniques. The initial solid contained 56.3% $Al_2O_3$, 8.2% $TiO_2$ and 6.9% Cl and other minor constituents, indicating the presence of $TiOCl_2$. After heating to 1000° C., XRF analysis showed 89.1% $Al_2O_3$, 12.6% $TiO_2$ and 0.03% Cl. X-ray diffraction analysis showed that, after heating to 200° C. the solid was mainly gibbsite, $Al(OH)_3$, with a small amount of boehmite, AlO.OH. Boehmite was the dominant phase at 400° C. while, after heating to 600° C. and 800° C., the principal phases were anatase ($TiO_2$) and delta-$Al_2O_3$. After ignition to 1000° C., the phases present were rutile ($TiO_2$) and corundum (alpha-$Al_2O_3$). This is consistent with the formation of non-crystalline anatase with gibbsite and boehmite at temperatures up to about 600° C. with crystalline anatase undergoing a phase change at temperatures approaching 1000° C. to produce a 10 to 12% coating of rutile.

EXAMPLE 2

Gibbsite, $Al(OH)_3$, was subjected to wet grinding to produce particles with an average size of about 1 micron. The suspension was filtered. 11.2 g of the wet filter cake (water content about 50 mol %) was stirred as a suspension in 100 ml of cyclohexane and 1.4 ml of $TiCl_4$ (about 10 mol %) was added dropwise and slowly by syringe. XRF analysis showed that the solid residue recovered after filtration contained 48.40% $Al_2O_3$, 13.10% $TiO_2$ and 8.24% Cl. Calcination of this residue at 1000° C. provided a solid with 76.8% $Al_2O_3$, 20.50% $TiO_2$ and 0.06% Cl. IFESEM investigation showed that the majority of the $Al_2O_3$ particles that reacted were totally covered with $TiO_2$ with some titania impregnating the particles.

EXAMPLE 3

10 g of $CaCO_3$ was vigorously stirred in 100 ml cyclohexane and water (0.9 ml, 50 mol %) was added by syringe. $TiCl_4$ was added as in examples 1 and 2 and the resulting solid recovered by filtration. XRF analysis showed that it contained 49.4% CaO, 8.9% $TiO_2$ and 7.97% Cl.

The invention claimed is:

1. A composition of matter comprising particles each having a substrate being alumina, and a pigment grade coating on said substrate being a layer of titanium dioxide, wherein each particle includes a transition zone in which titanium dioxide is interspersed into the underlying substrate.

2. A composition of matter according to claim 1, wherein said layer is a uniform, substantially homogenous undivided layer of titanium dioxide.

3. A composition of matter according to claim 1, wherein said layer is randomly distributed aver and into the surface of the substrate.

4. A composition of matter according to claim 1, further including an outer coating on said titanium dioxide layer of a substance to minimize interaction of the titanium dioxide layer with incident ultraviolet light.

5. A composition of matter comprising particles each having a substrate being alumina, and a coating on said substrate being a layer of hydrated titanium dioxide, wherein each particle includes a mixed transition zone containing interspersed hydrated titanium dioxide and hydrated alumina.

6. A composition of matter wherein the particles of claim 5 are converted by calcination to a pigment grade particle having a transition zone of titanium dioxide and alumina.

7. A method of forming particles of titania-coated substrate, including:
    contacting a bed of hydrated particles of a compound of a metal other than titanium or of certain non-metal elements with a solution of titanium tetrachloride in an organic solvent under conditions in which a layer comprising one or more involatile oxychloride or oxide compounds including a titanium oxychloride is formed at and below the surface of each of a multiplicity of said particles of said compound, which said compound thereby provides a substrate for said layer; and
    treating said oxychloride or oxide compound or compounds including said titanium oxychloride under conditions that include at least one of heat and steam to convert said layer to a titania coating on said particles.

8. A method according to claim 7, wherein said coating is a pigment grade coating.

9. A method according to claim 7, wherein said bed of hydrated particles is a moving bed.

10. A method according to claim 7, wherein said compound is selected for its ability to absorb or adsorb sufficient water to sustain the formation of said layer.

11. A method according to claim 7, wherein said substrate is substantially less valuable or expensive than Titania.

12. A method according to claim 7 wherein said coating of titania on each particle includes a transition zone in which titania is interspersed into said substrate.

13. A method according to claim 7 wherein said hydrated particles are selected from the group consisting of oxides, hydroxides and carbonates of aluminum, silicon, zinc, lead, tin, bismuth, and other transition metals, group III and group IV elements, and carbonates of calcium and magnesium.

14. A method according to claim 7 wherein said hydrated particles are alumina particles.

15. A method according to claim 14 wherein said titanium tetrachloride ($TiCl_4$) reacts with the hydroxyl groups or water molecules on the surface of the hydrated alumina particles to produce the titanium oxychloride compounds.

16. A method according to claim 15, wherein said coating of titania on each particle includes a transition zone in which titania is interspersed into said substrate.

17. A method to claim 14 wherein said hydrated alumina particles comprise or include aluminum hydroxide $Al(OH)_3$ or aluminum oxide hydroxide AlO.OH.

18. A method according to claim 17, wherein said coating of titania on each particle includes a transition zone in which titania is interspersed into said substrate.

19. A method according to claim 14, wherein said coating of titania on each particle includes a transition zone in which titania is interspersed into said substrate.

20. A method according to claim 7, further including pretreating said substrate with steam or water to ensure an amount of water is absorbed on the substrate.

21. A method according to claim 20, wherein said hydrated particles are alumina particles.

22. A method according to claim 21, wherein said titanium tetrachloride ($TiCl_4$) reacts with the hydroxyl groups or water molecules on the surface of the hydrated alumina particles to produce the titanium oxychloride compounds.

23. A method to claim 21, wherein said hydrated alumina particles comprise or include aluminum hydroxide $Al(OH)_3$ or aluminum oxide hydroxide AlO.OH.

24. A method according to claim 7 wherein said conditions include a proportional presence of water at said surface of each of said particles which is in deficit at the surface for an alternative reaction of the titanium tetrachloride to produce hydrated titania and an aqueous solution of hydrochloric acid, whereby said layer is formed in preference to said alternative reaction.

25. A method according to claim 24, wherein said hydrated particles are alumina particles.

26. A method according to claim 25, wherein said titanium tetrachloride ($TiCl_4$) reacts with the hydroxyl groups or water molecules on the surface of the hydrated alumina particles to produce the titanium oxychloride compounds.

27. A method to claim 25, wherein said hydrated alumina particles comprise or include aluminum hydroxide $Al(OH)_3$ or aluminum oxide hydroxide AlO.OH.

28. A method according to claim 7, wherein said organic solvent is one which is non-polar or of very low polarity, and immiscible with water.

29. A method according to claim 28, wherein said organic solvent is selected from the group consisting of carbon tetrachloride, benzene, cyclohexane, toluene, trichloroethylene, and heptane.

30. A method according to claim 7, wherein said layer includes a titanium oxychloride and said treating step comprises a hydrolysis treatment in which said layer is treated with steam under conditions that result in the coating of the substrate with hydrated titania ($TiO_2 \cdot xH_2O$).

31. A method according to claim 30, wherein said coating of titania on each particle includes a transition zone in which titania is interspersed into said substrate.

32. A method according to claim 30, wherein said hydrated particles are alumina particles.

33. A method according to claim 32, wherein said titanium tetrachloride ($TiCl_4$) reacts with the hydroxyl groups or water molecules on the surface of the hydrated alumina particles to produce the titanium oxychloride compounds.

34. A method to claim 32, wherein said hydrated alumina particles comprise or include aluminum hydroxide $Al(OH)_3$, or aluminum oxide hydroxide AlO.OH.

35. A method according to claim 7, wherein said treating step includes calcinations at a temperature in the range 200° to 1000° C.

36. A method according to claim 7, wherein said layer includes a titanium oxychloride and said treating step comprises heating said layer in a gas stream under conditions whereby the oxychlorides decompose to titania and titanium tetrachloride, and the $TiO_2$ remains as a coating of the surface of the substrate and titanium tetrachloride is swept away and recycled.

37. A method according to claim 36, wherein said coating of titania on each particle includes a transition zone in which titania is interspersed into said substrate.

38. A method according to claim 36, wherein said hydrated particles are alumina particles.

39. A method according to claim 38, wherein said titanium tetrachloride ($TiCl_4$) reacts with the hydroxyl groups or water molecules on the surface of the hydrated alumina particles to produce the titanium oxychloride compounds.

40. A method to claim 38, wherein said hydrated alumina particles comprise or include aluminum hydroxide $Al(OH)_3$ or aluminum oxide hydroxide AlO.OH.

41. A method according to claim 7, further including an outer coating on said titania layer of a substance to minimize interaction of the titania layer with incident ultraviolet light.

42. A method of forming particles having a titania coating on a substrate, including:

contacting a bed of hydrated particles of a compound of a metal other than titanium or of certain non-metal elements with a solution in an organic solvent of a titanium halide, under conditions in which a layer comprising one or more involatile oxyhalide or oxide compounds including a titanium oxychloride is formed at and below the surface of each of a multiplicity of said particles of said compound, which said compound thereby provides a substrate for said layer; and treating said oxyhalide or oxide compound or compounds including said titanium oxychloride under conditions that include at least one of heat and steam to convert said layer to a titania coating on said particles.

43. A method according to claim 42, wherein said bed of hydrated particles is a moving bed.

44. A method according to claim 42, wherein said compound is selected for its ability to absorb or adsorb sufficient water to sustain the formation of said layer.

45. A method according to claim 42, wherein said hydrated particles are selected from the group consisting of oxides, hydroxides and carbonates of aluminum, silicon, zinc, lead, tin, bismuth, and other transition metals, group III and group IV elements, and carbonates of calcium and magnesium.

46. A method according to claim 42, wherein said halide reacts with the hydroxyl groups or water molecules on the surface of the hydrated particles to produce the oxyhalide or oxide compounds.

47. A method according to claim 42, wherein said organic solvent is one which is non-polar or of very low polarity, and immiscible with water.

48. A method according to claim 47, wherein said organic solvent is selected from the group consisting of carbon tetrachloride, benzerxe cyclohexane, toluene, trichlorethylene, and heptane.

49. A method according to claim 42, wherein said halide is a chloride, whereby the or each oxyhalide compound is an oxychloride compound.

50. A method according to claim 49, wherein said conditions include a proportional presence of water at said surface of each of said particles which is in deficit at the surface for an alternative reaction of the chloride to produce a hydrated oxide and an aqueous solution of hydrochloric acid, whereby said layer is formed in preference to said alternative reaction.

51. A method of forming particles of titania-coated substrate, including contacting a bed of hydrated particles of alumina with a solution of titanium tetrachloride in an organic solvent, under conditions in which a layer comprising one or more involatije oxychloride or oxide compounds including a titanium oxychloride is formed at and below the surface of each of a multiplicity of said alumina particles, which said alumina thereby provides a substrate for said layer; and treating said oxychloride or oxide compound or compounds including said titanium oxychloride under conditions whereby the oxychlorides decompose to titania and titanium tetrachloride, and the titania remains as a coating of the surface of the substrate and titanium tetrachloride is swept away and recycled.

52. A method of forming particles of a coated alumina substrate comprising the steps of:

contacting a bed of hydrated particles of alumina with a solution of titanium tetrachloride in an organic solvent, under conditions in which a layer comprising one or more involatile oxychloride or oxide compounds including a titanium oxychloride is formed at and below the surface of each of a multiplicity of said alumina particles, which said alumina thereby provides a substrate for said layer; and treating said oxychloride or oxide compound or compounds including said titanium oxychloride under conditions that include at least one of heat and steam to convert said layer to a hydrated titanium dioxide coating on said particles.

53. A method according to claim 52, further comprising the step of calcination wherein said coating is converted to a pigment grade coating having a transition zone of titanium dioxide and alumina.

54. A method according to claim 52, wherein said coating of hydrated titanium dioxide on each particle includes a transition zone in which hydrated titanium hydroxide is interspersed into said substrate.

\* \* \* \* \*